Figure 1:
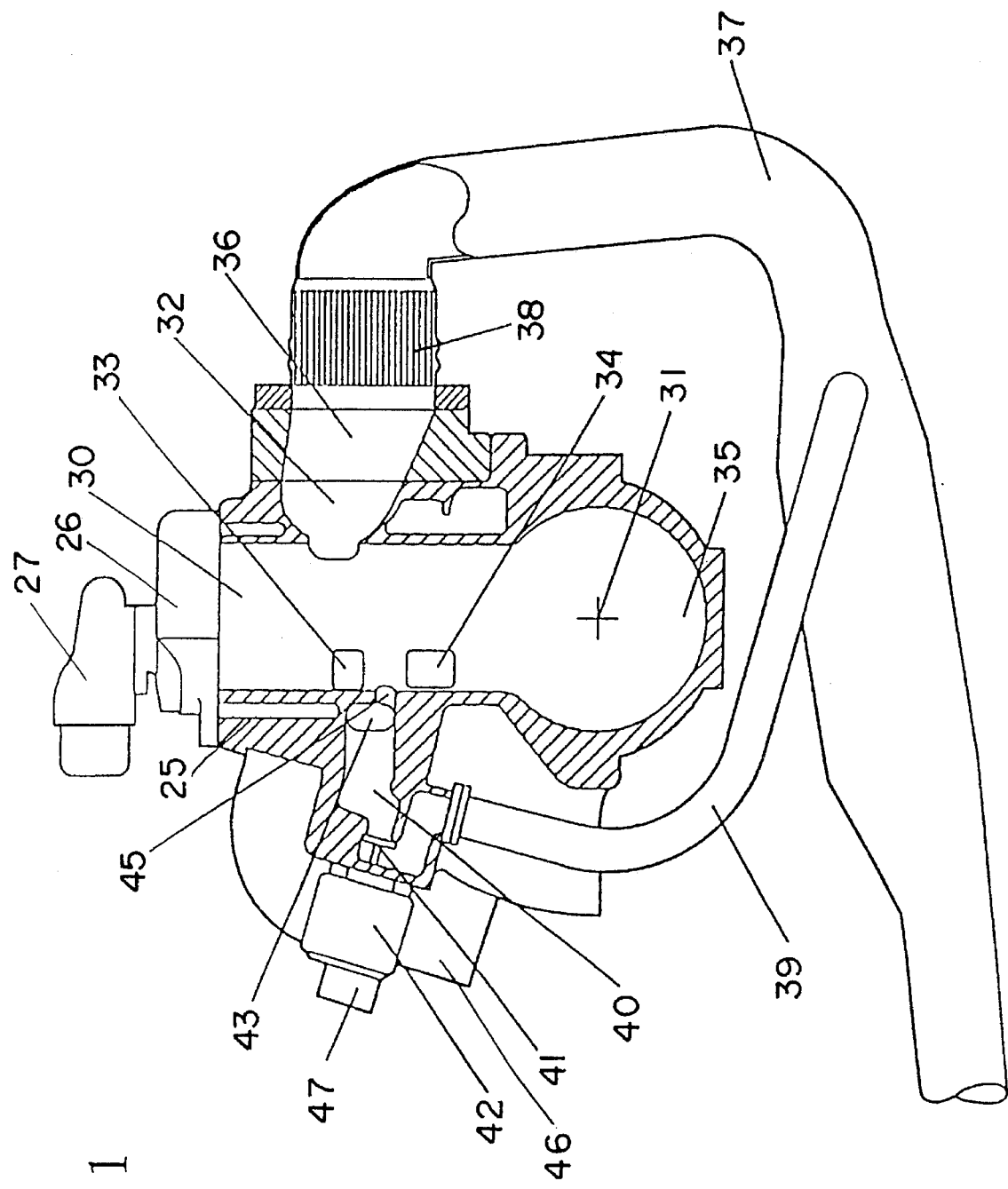

United States Patent

Bell et al.

[11] Patent Number: 5,558,070
[45] Date of Patent: Sep. 24, 1996

[54] EXHAUST GAS RECIRCULATION IN A TWO STROKE ENGINE

[75] Inventors: Gregory B. Bell, Woodlands; David R. Worth, Shenton Park, both of Australia

[73] Assignee: Orbital Engine Company (Australia) Pty. Limited, Western Australia, Australia

[21] Appl. No.: 446,737
[22] PCT Filed: Jan. 4, 1994
[86] PCT No.: PCT/AU94/00009
  § 371 Date: Jun. 6, 1995
  § 102(e) Date: Jun. 6, 1995
[87] PCT Pub. No.: WO94/16207
  PCT Pub. Date: Jul. 21, 1994

[30] Foreign Application Priority Data

Jan. 4, 1993 [AU] Australia ............... PL6639

[51] Int. Cl.⁶ .................................. F02M 25/07
[52] U.S. Cl. .................. 123/568; 123/570; 123/571
[58] Field of Search ............... 123/73 R, 73 A, 123/73.5 C, 568, 569, 570, 571

[56] References Cited

U.S. PATENT DOCUMENTS

| | | | |
|---|---|---|---|
| 3,581,719 | 6/1971 | Gau et al. | 123/73 R |
| 4,213,431 | 7/1980 | Onishi et al. | 123/73 R |
| 4,318,373 | 3/1982 | Soubis | 123/568 |
| 4,546,751 | 10/1985 | Jarnuszkiewicz et al. | 123/568 |
| 4,682,571 | 7/1987 | Kaufman et al. | 123/570 |
| 5,357,919 | 10/1994 | Ma | 123/568 |
| 5,377,650 | 1/1995 | Warner | 123/568 |
| 5,425,346 | 6/1995 | Mavinahally | 123/568 |
| 5,443,547 | 8/1995 | Morikawa | 123/571 |

FOREIGN PATENT DOCUMENTS

| | | | |
|---|---|---|---|
| 840479 | 6/1952 | Germany . | |
| 2946483A1 | 5/1981 | Germany . | |
| 67011 | 6/1978 | Japan | 123/570 |
| 2270115 | 3/1994 | United Kingdom . | |
| 94/28299 | 12/1994 | WIPO . | |

OTHER PUBLICATIONS

WO,A,79/00757 published Oct. 4, 1979.

*Primary Examiner*—Willis R. Wolfe
*Attorney, Agent, or Firm*—Nikaido Marmelstien Murray & Oram LLP

[57] ABSTRACT

A method of operating a two stroke cycle crankcase scavenged internal combustion engine, comprising selectively delivering exhaust gas from a location downstream of the engine exhaust port to the engine crankcase to be delivered together with air in the crankcase to the engine combustion chamber. The quantity of exhaust gas delivered to the crankcase during each engine cycle is controlled according with engine operating conditions and the rate of supply of exhaust gas to the crankcase is controlled relative to engine operating conditions such as by an ECU managed valve that responds to engine operating conditions such as load, speed and temperature. The exhaust gas is admitted to the crankcase during a period when the pressure in the crankcase is below that of the available exhaust gas.

27 Claims, 2 Drawing Sheets

EXHAUST GAS RECIRCULATION IN A TWO STROKE ENGINE

This invention relates to internal combustion engines operating on the two stroke cycle and to the management of the combustion process thereof to control the level of contaminants in the exhaust emissions.

It has in the past been recognised that two stroke cycle engines exhibit poor performance in the area of fuel consumption and also in the area of the level of harmful emissions in the engine exhaust. However, there are substantial benefits to be obtained by wider use of engines operating on the two stroke cycle. Firstly, because of their relatively simple construction, and secondly, because of their relatively small physical size and resultant high power to weight ratio. There has accordingly been considerable development in recent years directed to the control of the combustion process of two stroke cycle engines in a manner to reduce the level of emissions in the exhaust, and/or reduce the fuel consumption.

It has been recognised that the introduction of exhaust gas into the fuel/air mixture prior to the ignition thereof can contribute to a reduction in the production of $NO_x$ (oxides of nitrogen) during the combustion process, as the presence of exhaust gas in the fuel/air mixture reduces the resultant temperature and pressure in the engine cylinder resulting from the combustion, which is contrary to the high temperature and pressure conditions that promote the creation of $NO_x$. This process of mixing exhaust gas with the fuel/air mixture is commonly referred to as exhaust gas recirculation (EGR) and is typically achieved by bleeding a controlled quantity of exhaust gas from the exhaust system into the air induction manifold of the engine.

Although this procedure has been used successfully in four stroke cycle engines, it is not as effective when applied to two stroke cycle engines, due principally to the low level of vacuum existing downstream from the conventional throttle in the air induction system. Hence, this would result in a low rate of intake of exhaust gas and in the case of a multi cylinder engine, a poor distribution of the exhaust gas in the induced air. Further, particularly in the case of a crankcase scaveneged engine, there is a significant time lag in the response by the engine to the introduction of the exhaust gas to the induction system due to the distance it is required to travel before entering the combustion chamber. Also, where exhaust gas is introduced into the inducion system of a crankcase scavenged two stroke cycle engine as the air capacity of the crankcase is greater than that of the cylinder, there is a further time lag in a change in rate of exhaust gas supply to the crankcase being seen in the engine cylinder. Also, the particulate materials normally present in exhaust gas can build up on mechanisms in the induction system of such two stroke cycle engines such as throttle valves and crankcase reed valves, and hence interfere in the effective operation thereof.

It has been previously proposed in publications such as International Patent Publication WO 79/00757 by J. P. Soubis and U.S. Pat. No. 3,581,719 by Gau to recycle exhaust gas into the combustion chamber for the purpose of returning thereto any unburnt fuel that may be in the exhaust gas. It has long been recognised that carburetted two stroke cycle engines exhibit the problem that part of the air and fuel charge that enters the combustion chamber passes out through the exhaust port prior to the commencement of combustion. The above referred to prior patents each are directed to overcoming this problem by re-directing the fuel rich portion of the exhaust gas back into the air intake or crankcase for recycling into the combustion chamber. As the recycled portion of the exhaust gas is primarily fuel and fresh air, it will not have a significant effect in the control of the generation of $NO_x$, the problem the present invention is directed to overcoming.

It is proposed in U.S. Pat. No. 4,213,431 by Onishi to recycle exhaust gas into the air induction system of a two stroke cycle engine with the intent of control of the generation of $NO_x$ during the combustion process. In this proposal the exhaust gas is introduced directly into the air induction passage upstream of the carburettor. A valve is provided in the duct conveying the exhaust gas to the induction passage, the valve being temperature activated.

It is the object of the present invention to provide a method for introducing exhaust gas into the combustion chamber of a two stroke cycle engine whereby effective control of the amount and distribution of the exhaust gas can provide the most beneficial results in the management of exhaust emissions.

With this object in view, there is provided a method of controlling the generation of $NO_x$ in a fuel injected two stroke cycle crankcase scavenged internal combustion engine comprising selectively delivering exhaust gas from a location downstream of the engine exhaust port to the engine crankcase to be delivered from the crankcase to a combustion chamber of the engine, controlling the quantity of exhaust gas delivered to the crankcase during each cycle of the engine in accordance with the engine operating conditions, and timing the delivery of the exhaust gas to the crankcase with respect to the cycle of the engine.

As the admission of the exhaust gas to the crankcase is principally for the control of exhaust emissions, it is not necessary, and in some circumstances can be undesirable, to admit exhaust gas to the crankcase under all operating conditions. Accordingly, it is desirable to be selective in the introduction of the exhaust gas to the crankcase and also to control the rate of supply of exhaust gas. This control of the exhaust gas supply to the engine crankcase can be achieved by an ECU managed control valve provided between the exhaust system of the engine and the engine crankcase to control the exhaust gas flow to the crankcase. The ECU managing the control valve preferably receives inputs regarding engine operating conditions and in particular, engine load, speed and temperature conditions. The ECU determines from these inputs when exhaust gas is required to be introduced to the crankcase and the quantity thereof required.

Preferably, the control valve incorporates a position feedback means to indicate to the ECU the actual position of the valve to thereby permit comparison of the actual position with the required position, thereby enhancing the accuracy of the control of the rate of supply of exhaust gas to the crankcase. Alternatively, the ECU can be programmed to determine the actual mass of exhaust gas delivered to the crankcase each cycle and to compare that mass with the required mass of exhaust gas for the existing engine operating conditions. Any correction required can then be effected by adjustment of the rate of supply of exhaust gas to the crankcase via the ECU controlled valve.

In a multi-cylinder two stroke cycle crankcase scavenged engine, where each cylinder has an individual crankcase compartment, a plenum chamber may be provided which communicates individually with the crankcase of each cylinder, with exhaust gas from one or more of the engine cylinders being provided to the plenum chamber. Under normal conditions, it may only be necessary to supply exhaust gas from one or some of the cylinders to the plenum chamber, even where a greater number of cylinders are supplied with exhaust gas from the plenum chamber.

In part, the exhaust gas performs the emission control function by reducing the overall cycle temperature and pressure in the engine cylinder during combustion, as the exhaust gas has a higher specific heat than air and hence will reduce the overall cycle temperature of the gases in the combustion chamber. As high temperature is one of the requirements for the production of $NO_x$, this reduction in overall cycle temperature contributes to a reduction in the production of $NO_x$. It is also to be noted that the exhaust gas of a two stroke cycle engine has a higher oxygen content than that of a four stroke cycle engine and therefore more exhaust gas is required to be recycled in a two stroke engine to receive a comparable level of $NO_x$ control.

The use of a plenum chamber in a multi-cylinder engine can readily be made to contribute to a reduction in the temperature of the exhaust gas delivered to the combustion chamber and in addition, provision can be made to enhance the dissipation of heat from the plenum chamber to achieve a further temperature reduction. Also a heat exchanger can be incorporated in the path of the exhaust gas to the engine crankcase to further contribute to a reduction of the temperature of the exhaust gas prior to admission to the crankcase. Conveniently, the duct conveying the exhaust gas to the cylinder or cylinders or to the plenum chamber can be cooled by external fins or by liquid or water cooling such as from the engine cooling system.

In accordance with another aspect of the invention, there is provided a method as claimed in any one of claims 1 to 7 including cooling the exhaust gas prior to delivery to the crankcase.

In one embodiment, a piston controlled port can be provided in the lower portion of the engine cylinder wall to communicate with the crankcase of that particular cylinder and also with the supply of exhaust gas, such as via the plenum chamber. Preferably, theh port communicates with the exhaust system via an ECU controlled valve as previously described. The port is located so that it will be exposed whilst the piston is within a limited extent of movement on either side of the top dead centre position thereof which represents the period of minimum pressure (sub-atmospheric) in the crankcase. Conveniently, the port can be located so as to be open for approximately 40° to 60° of crankshaft rotation to each side of the top dead centre position of the piston stroke.

It may be convenient in some engine configurations to provide two or more such piston controlled ports for each crankcase to provide a relatively large flow area for the exhaust gas into the crankcase. Preferably, the port or ports have the major dimension thereof in the circumferential direction of the cylinder to provide the maximum open port area during the restricted port open period. It has been found that the use of a piston controlled port to control the timing of admission of the exhaust gas results in improved equitable cylinder to cylinder distribution of the exhaust gas.

Preferably, the ECU managing the degree of opening of the valve is programmed to control the valve by reference to a speed/load based look-up o map. The load may be plotted on a FPC (fuel per cycle) basis. In addition, the ECU preferably also responds to engine temperature since, for example, at some cold start conditions, the addition of exhaust gas can be detrimental to the engine operating stability.

In an engine where catalyst unit is provided in the exhaust system the exhaust gas can be taken from the exhaust system either upstream or downstream of the catalyst unit.

The invention will be more fully understood from the following description of two alternative arrangements of crankcase scavenged two stroke cycle engines.

Figure 2:
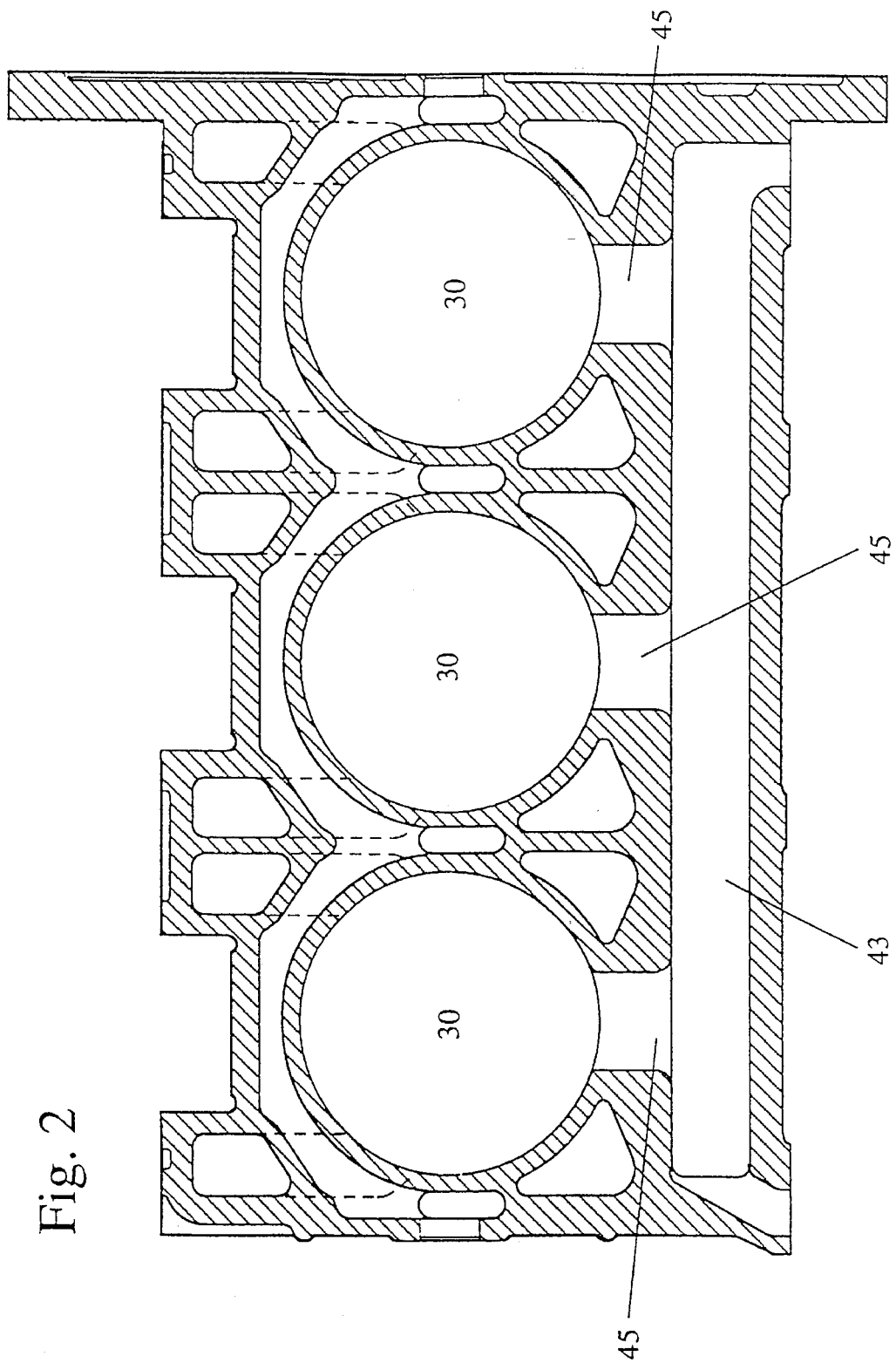

In the drawings:

FIG. 1 is a transverse sectional view of a crankcase scavenged two stroke cycle engine incorporating one embodiment of an exhaust gas recirculation system; and FIG. 2 is a longitudinal sectional plan view of a portion of a three cylinder engine incorporating the exhaust gas recirculation system as shown in FIG. 1.

Referring now to FIG. 1 of the drawings, there is shown a partial transverse section of a crankcase scavenged two stroke cycle engine wherein the cylinder block 25 is in cross section and the cylinder head 26 and fuel injector equipment 27 are in full outline. For the purposes of clarity, the piston and connecting rod are not shown. The engine is basically of conventional construction having a cylinder 30 in which a piston (not shown) reciprocates and is connected by a connecting rod (not shown) to a crankshaft shown diagrammatically at 31. The cylinder 30 has an exhaust port 32 and a plurality of transfer ports, two of which are shown at 33 and 34 to provide communication between a crankcase 35 and the cylinder 30, subject to the position of the piston within the cylinder 30 as per the conventional two stroke cycle principle. FIG. 1 may be of a single cylinder engine or in-line multi-cylinder engine as shown in FIG. 2.

The exhaust port 32 communicates with an exhaust passage 36 which in turn communicates with an exhaust pipe 37 in the mouth of which are located conventional exhaust catalyst elements 38. Downstream of the catalyst elements 38, the exhaust pipe 37 communicates with a branch passage 39 which leads to a cavity 40 in the cylinder block in FIG. 1, the branch passage 39 communicated with the exhaust pipe 37 downstream of the exhaust catalyst elements 38. However, it may alternatively communicate with the exhaust pipe 37 upstream of the catalyst elements 38 where the pressure of the exhaust gas is higher, the temperature is lower, and the oxygen content is lower.

Communication between the passage 39 and the cavity 40 is under the control of the valve 41 being part of a solenoid valve mechanism 42. The cavity 40 communicates with an internal plenum chamber 43 provided in the cylinder block which, in a multi cylinder engine as shown in FIG. 2, communicates individually with each cylinder of the engine through a respective exhaust gas recirculation port 45. The ports 45 are positioned in the wall of the respective cylinders 30 so that during a selected portion of each cylinder cycle, the respective ports 45 are uncovered by the pistons to permit exhaust gas to flow from the plenum chamber 43 into the respective crankcase 35 of each cylinder 30 of the engine.

As previously indicated, the preferred timing of the opening and closing of the port 45 is within 40° to 60° before and after the top dead centre position of the piston in the respective cylinder 30 and preferably between 45° and 55°. The timing of the supply of exhaust gas to the crankcase is preferably at a period in the engine cycle when the pressure in the crankcase is below that in the exhaust system. It will be appreciated that the communication between the crankcase 35 and the EGR port 45 is determined by the location of an appropriate aperture in the crankcase wall with respect to the path of the lower edge of the skirt of the piston as is common technology in relation to the control of the flow of gases through the transfer ports of two stroke cycle engines, such as the transfer ports 33 and 34 as shown in FIG. 1. Further, it is preferred that the port 45 is located on the side of the cylinder against which the piston is thrust so as to effectively seal the pod 45 when required.

As referred to previously, it is desirable to control the delivery of exhaust gas through the port 45 in accordance with variations in engine operating conditions and for this purpose, the solenoid mechanism 42, or other suitable mechanism that controls the operation of the valve 41 is under the control of a programmed electronic control unit (ECU) 46 incorporating appropriate look-up maps. Usually, the map is arranged so that the valve 41 controlling the exhaust gas flow to the crankcase 35 is ramped rapidly from closed to open once the fuelling rate increases above a selected level. The solenoid mechanism 42 is typically provided with a valve element position sensor 47 which provides feedback information to the ECU 46 to facilitate the accurate control of the position of the valve 41 to achieve the required rate of supply of exhaust gas to the respective crankcase cavities 35 of the engine. The ECU 46 typically receives inputs indicating the engine speed, engine load, and engine temperature. Provision can also be made for the ECU to monitor and adjust the movement of the valve 41 to detect and correct for the effects of carbon build-up on the valve of seat in which it operates.

As an alternative to the use of look-up maps to control the rate of supply of exhaust gas, the ECU can be programmed to determine the mass of air entering each crankcase 35 and to determine the combined exhaust gas and air mass in the respective crankcase 35 at a selected point in the cycle of that engine cylinder 30. The mass of air entering the crankcase 35 can be determined by a conventional hot wire air flow meter in the air induction passage, and the mass of air and exhaust gas can be determined by measuring the temperature and pressure in the crankcase 35 at a preset point in the engine cycle when the volume of the space in the crankcase 35 is known. From these two mass determinations, the actual mass of exhaust gas can be determined and compared with the required amount of exhaust gas, thus determining if adjustment is required to be made to the rate of supply of the exhaust gas. This method of determining the exhaust gas content within the crankcase can be used in conjunction with other forms of control of EGR than that described herein. Also, by determining the air mass in the crankcase when no exhaust gas is present therein, the accuracy of the measurement process can be checked by comparing the calculated air mass with the air mass as determined by the hot wire air flow meter.

Other engine operating parameters that can be controlled, in conjunction with the supply of exhaust gas to the crankcase 35, include advance of the ignition spark to increase combustion temperature, and use of a back pressure valve in the exhaust system, downstream of the point of exhaust gas take-off to control the rate of exhaust gas available for supply to the combustion chamber. The greater the back pressure in the exhaust system, the greater the pressure and hence the rate of supply of exhaust gas for admission to the crankcase 35.

Also, the exhaust gas to be delivered to the engine cylinder 30 can be passed through a heat exchanger or otherwise cooled means prior to entry to the crankcase 35 in order to increase the density thereof whereby a greater mass of exhaust gas would then be available for delivery to the crankcase 35. In FIG. 1, the branch passage 39 communicates with the exhaust pipe 37 downstream of the catalyst element 38. However, it may alternatively communicate with the exhaust pipe 37 upstream of the catalyst element where the pressure of the exhaust gas is higher and the temperature lower.

In practice, it has been found convenient to provide multiple delivery locations for the exhaust gas to the plenum chamber to assist in achieving substantial uniform distribution of the exhaust gas from a common plenum chamber into the respective crankcase of each cylinder.

Also, in the higher range of operating speeds, the rate of rise of the crankcase pressure, after top dead centre position of the piston, is such that a reverse flow of air from each respective crankcase through the ports 45 can occur. This can lead to a dilution of the exhaust gas in the plenum chamber and possibility of unequal distribution of exhaust gas to the respective engine cylinders. This problem can be at least reduced by suitable selection of the length of the ports 45 between the plenum chamber 43 and the crankcase chambers 35, so that any reverse flow of gas from the crankcase is substantially retained with the port 45 associated with that crankcase chamber 35 and not passed into the plenum chamber 43.

The claims defining the invention are as follows:

1. A crankcases scavenged two stroke cycle engine, comprising means to selectively convey exhaust gas from an engine exhaust system to at least one crankcase of the engine, means to regulate the mass of exhaust gas delivered to said crankcase each engine cycle, and means for controlling the timing of the delivery of said exhaust gas to the crankcase in relation to the engine cycle;

wherein the means to regulate the mass of exhaust gas includes valve means selectively operably to control to control exhaust gas flow along said means to convey the exhaust gas; and wherein said means to regulate the mass of gas flow includes feed-back means to determine the actual mass of exhaust gas delivered to the crankcase per cycle and means to correct variations between the required quantity and delivered quantity of exhaust gas delivered per cycle.

2. A method of controlling the generation $NO_x$ in a fuel injected two stroke cycle crankcase scavenged internal combustion engine comprising selectively delivering exhaust gas from a location downstream of an exhaust port of the engine to a crankcase of the engine to be delivered from the crankcase to a combustion chamber of the engine, controlling, by an electronic control unit, a quantity of exhaust gas delivered to the crankcase during each cycle of the engine in accordance with engine operating conditions, and timing the exhaust gas delivery to the crankcase with respect to engine cycle.

3. A method as claimed in claim 2 wherein the control of the quantity of exhaust gas delivered to the crankcase is determined with reference to at least one of engine load or speed.

4. A method as claimed in claim 2 wherein the delivery of the exhaust gas to the crankcase commences between 55 to 45 degrees before a top dead center point in a combustion chamber cycle.

5. A method as claimed in claim 4 wherein the control of the quantity of exhaust gas delivered to the crankcase is determined with reference to at least one of engine load or speed.

6. A method as claimed in claim 2 wherein the delivery of the exhaust gas to the crankcase commences between 60 and 40 degrees before a top dead center point in a combustion chamber cycle.

7. A method as claimed in claim 6 wherein the control of the quantity of exhaust gas delivered to the crankcase is determined with reference to at least one of engine load or speed.

8. A method as claimed in claim 2 wherein the timing of the delivery of the exhaust gas to the crankcase is controlled by a location of a port in the crankcase that is opened and closed in response to movement of a piston in a cylinder.

9. A method as claimed in claim 8 wherein the control of the quantity of exhaust gas delivered to the crankcase is determined with reference to at least one of engine load or speed.

10. A method as claimed in claim 8 wherein the delivery of the exhaust gas to the crankcase commences between 60 and 40 degrees before a top dead center point in a combustion chamber cycle.

11. A method as claimed in claim 10 wherein the control of the quantity of exhaust gas delivered to the crankcase is determined with reference to at least one of engine load or speed.

12. A method as claimed in claim 8 wherein the delivery of the exhaust gas to the crankcase commences between 55 to 45 degrees before a top dead center point in a combustion chamber cycle.

13. A method as claimed in claim 12 wherein the control of the quantity of exhaust gas delivered to the crankcase is determined with reference to at least one of engine load or speed.

14. A method as claimed in claim 2 wherein the delivery of the exhaust gas to the crankcase is commenced after a closing of transfer ports that communicate the crankcase with the combustion chamber.

15. A method as claimed in claim 14 wherein the control of the quantity of exhaust gas delivered to the crankcase is determined with reference to at least one of engine load or speed.

16. A method as claimed in claim 14 wherein the delivery of the exhaust gas to the crankcase commences between 55 to 45 degrees before a top dead center point in a combustion chamber cycle.

17. A method as claimed in claim 16 wherein the control of the quantity of exhaust gas delivered to the crankcase is determined with reference to at least one of engine load or speed.

18. A method as claimed in claim 14 wherein the timing of the delivery of the exhaust gas to the crankcase is controlled by a location of a port in the crankcase that is opened and closed in response to movement of a piston in a cylinder.

19. A method as claimed in claim 18 wherein the control of the quantity of exhaust gas delivered to the crankcase is determined with reference to at least one of engine load or speed.

20. A method as claimed in claim 14 wherein the delivery of the exhaust gas to the crankcase commences between 60 and 40 degrees before a top dead center point in a combustion chamber cycle.

21. A method as claimed in claim 20 wherein the control of the quantity of exhaust gas delivered to the crankcase is determined with reference to at least one of engine load or speed.

22. A method as claimed in claims 2, 14, 8, 18, 6, 20, 10, 4, 16, 12, 3, 15, 9, 19, 7, 21, 11, 5, 17, or 13 including determining an actual mass of exhaust gas delivered to the crankcase per cycle and correcting variations between a required quantity and delivered quantity of exhaust gas delivered to the crankcase per cycle.

23. A method as claimed in claims 2, 14, 8, 18, 6, 20, 10, 4, 16, 12, 3, 15, 9, 19, 7, 21, 11, 5, 17 or 13 including cooling the exhaust gas prior to delivery to the crankcase.

24. A method as claimed in claim 23 including determining an actual mass of exhaust gas delivered to the crankcase per cycle and correcting variations between a required quantity and delivered quantity of exhaust gas delivered to the crankcase per cycle.

25. A method as claimed in claims 3, 15, 9, 19, 7, 21, 11, 5, 17, or 13 wherein the control of the quantity of exhaust gas delivered to the crankcase is determined with reference to engine temperature.

26. A method as claimed in claim 25 including cooling the exhaust gas prior to delivery to the crankcase.

27. A method as claimed in claim 26 including determining an actual mass of exhaust gas delivered to the crankcase per cycle and correcting variations between a required quantity and delivered quantity of exhaust gas delivered to the crankcase per cycle.

* * * * *